United States Patent [19]

Frederick

[11] 3,802,581
[45] Apr. 9, 1974

[54] MEANS FOR SELECTIVELY PICKING A PRESELECTED NUMBER OF PANEL SPACED ARTICLES FROM AN INVENTORY STORAGE

[75] Inventor: Philip Frederick, Brooklyn, N.Y.
[73] Assignee: Supreme Equipment & Systems Corp., Brooklyn, N.Y.
[22] Filed: Mar. 5, 1973
[21] Appl. No.: 338,204

[52] U.S. Cl. ............... 214/16.4 A, 221/13, 221/123
[51] Int. Cl. ............................................. B65g 1/06
[58] Field of Search .. 214/16.4 A, 16.4 R, 16.1 DB, 214/16.4 B, 16 B; 221/123, 13, 69, 79

[56] References Cited
UNITED STATES PATENTS

| | | | |
|---|---|---|---|
| 3,076,566 | 2/1963 | Dennis | 214/16.4 A |
| 3,206,041 | 9/1965 | McGrath | 214/8.5 |
| 3,351,219 | 11/1967 | Ruderfer | 214/16.4 A |
| 3,463,566 | 8/1969 | Powers | 214/16.4 A |
| 3,490,616 | 1/1970 | Castaldi | 214/16.4 A |
| 3,608,749 | 9/1971 | Zollinger | 214/16.4 A |

Primary Examiner—Gerald M. Forlenza
Assistant Examiner—R. B. Johnson
Attorney, Agent, or Firm—Sandoe, Hopgood and Calimafde

[57] ABSTRACT

The invention contemplates efficient automatic retrieval of selected numbers of like compressible or otherwise irregular articles, such as flexibly bagged articles of clothing, carded merchandise or the like, from inventory storage, wherein inventory is accommodated in a two-dimensional matrix of storage compartments having open ends in essentially a single surface. Scanning and two-component positioning mechanism place an article-retriever and collector device in position to retrieve the desired article, unique to a particular storage compartment. The retriever is automatically driven in a cycle extending into and out of the particular compartment and includes item-engaging means operative for only a part of the retraction stroke, such that only the desired number of articles is removed in any such cycle, and such that the articles which are not retrieved from the compartment are left in a forward position in the compartment.

16 Claims, 12 Drawing Figures

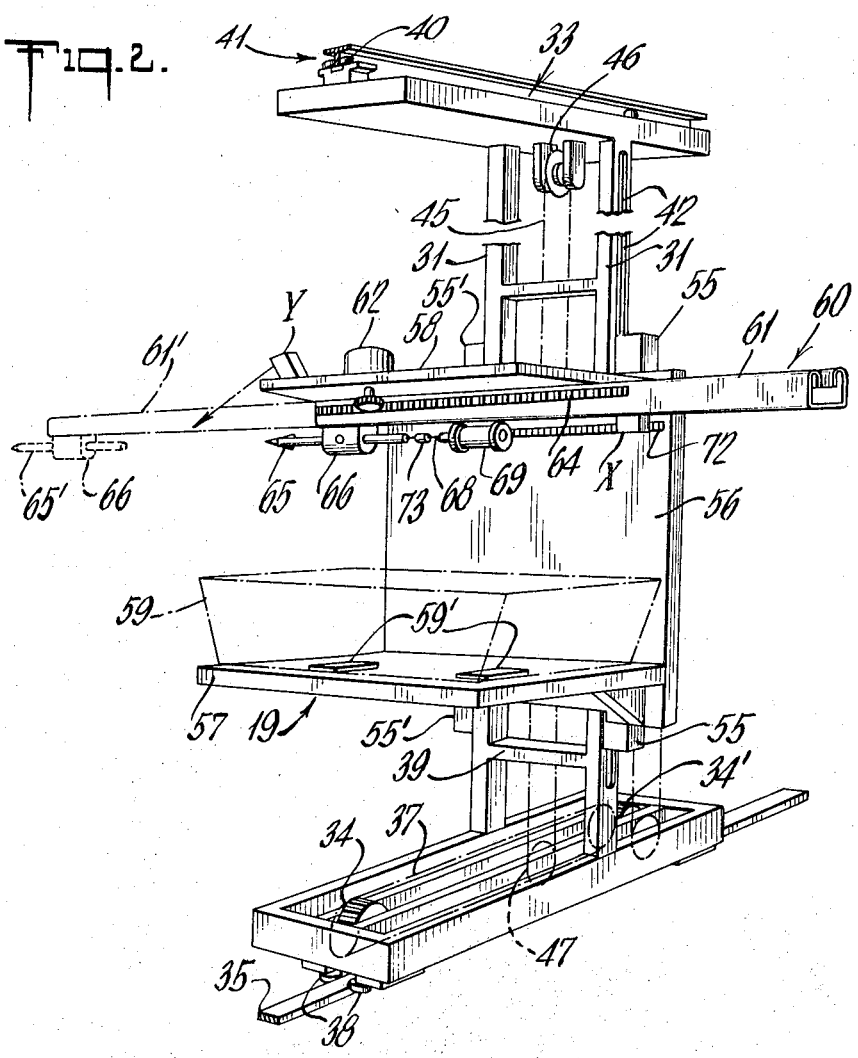
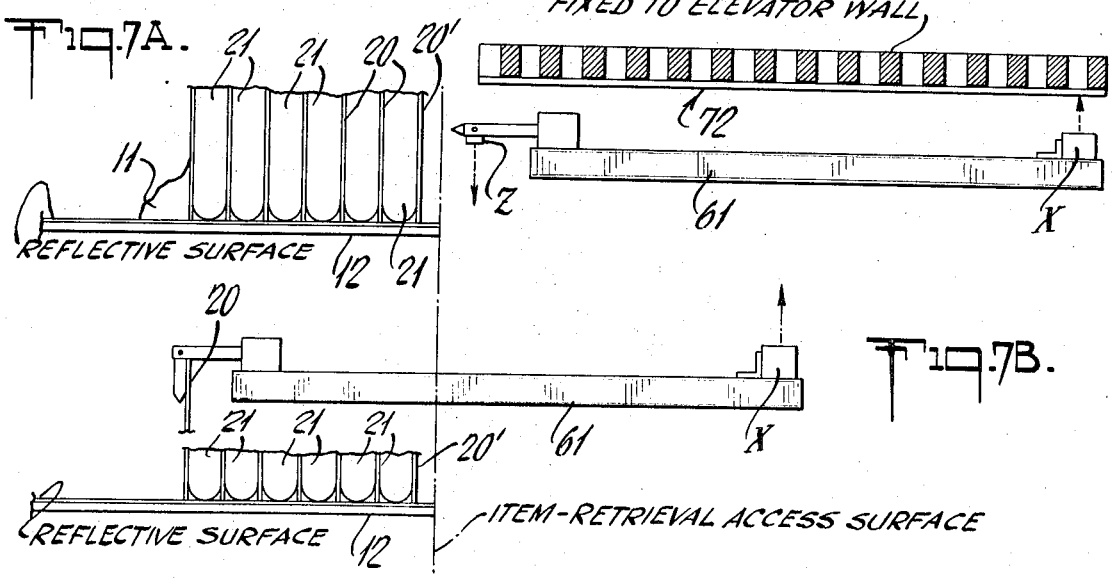

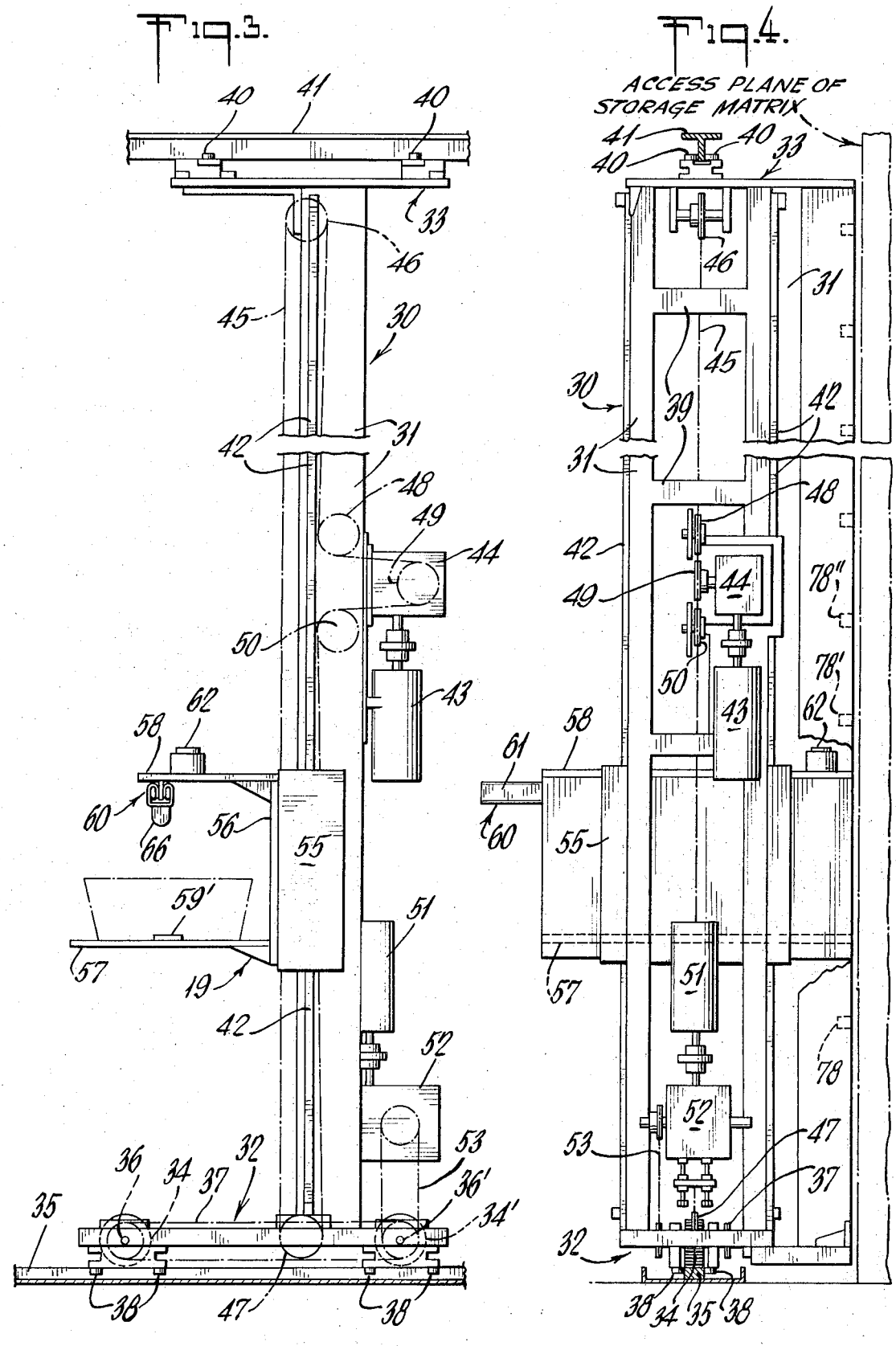

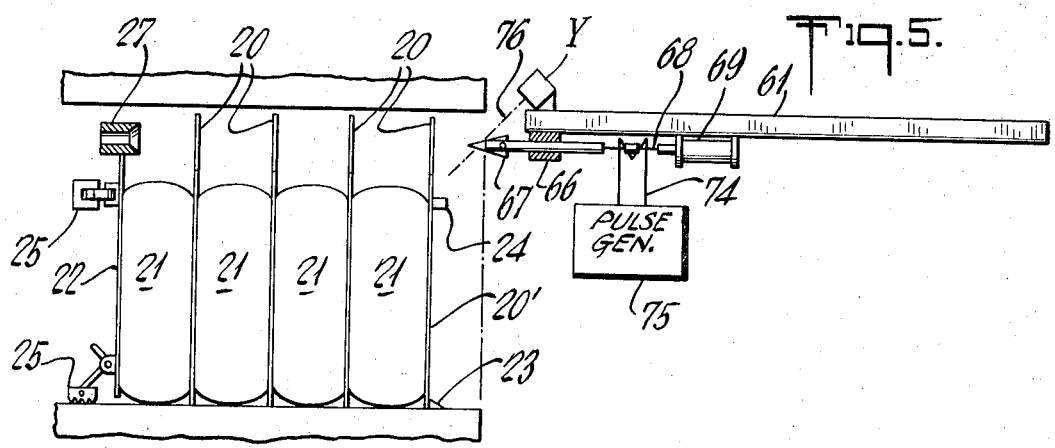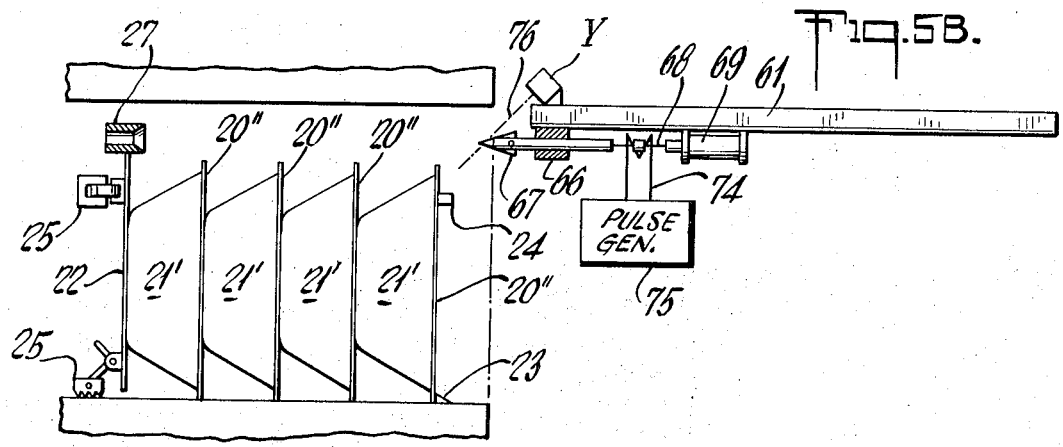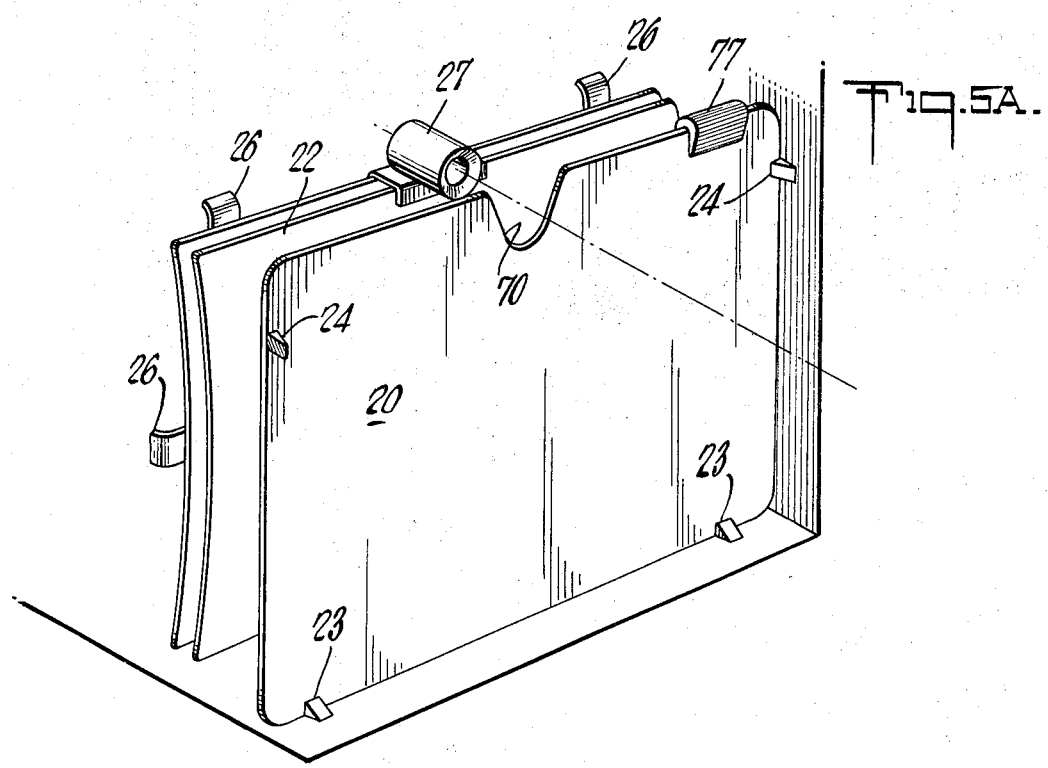

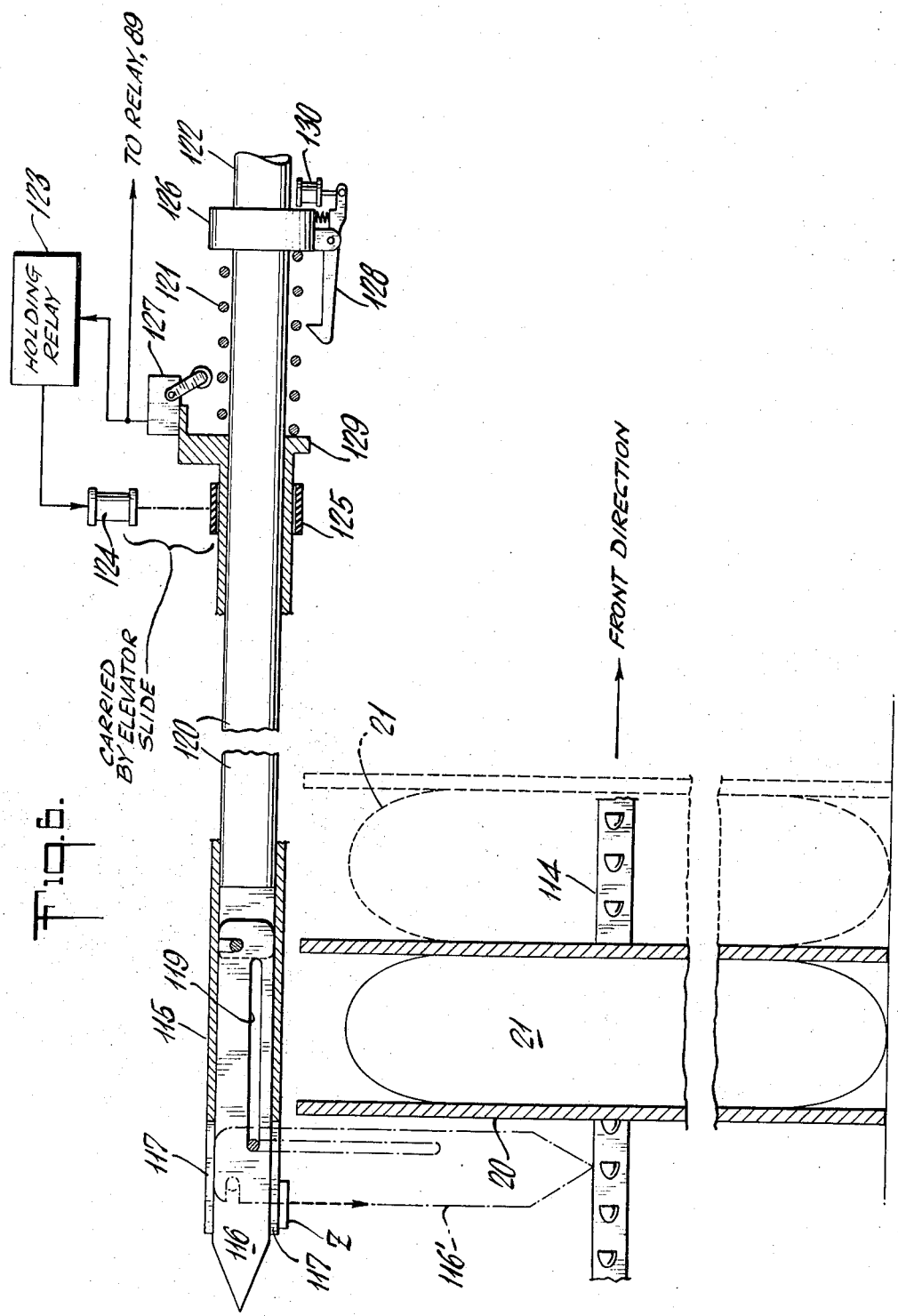

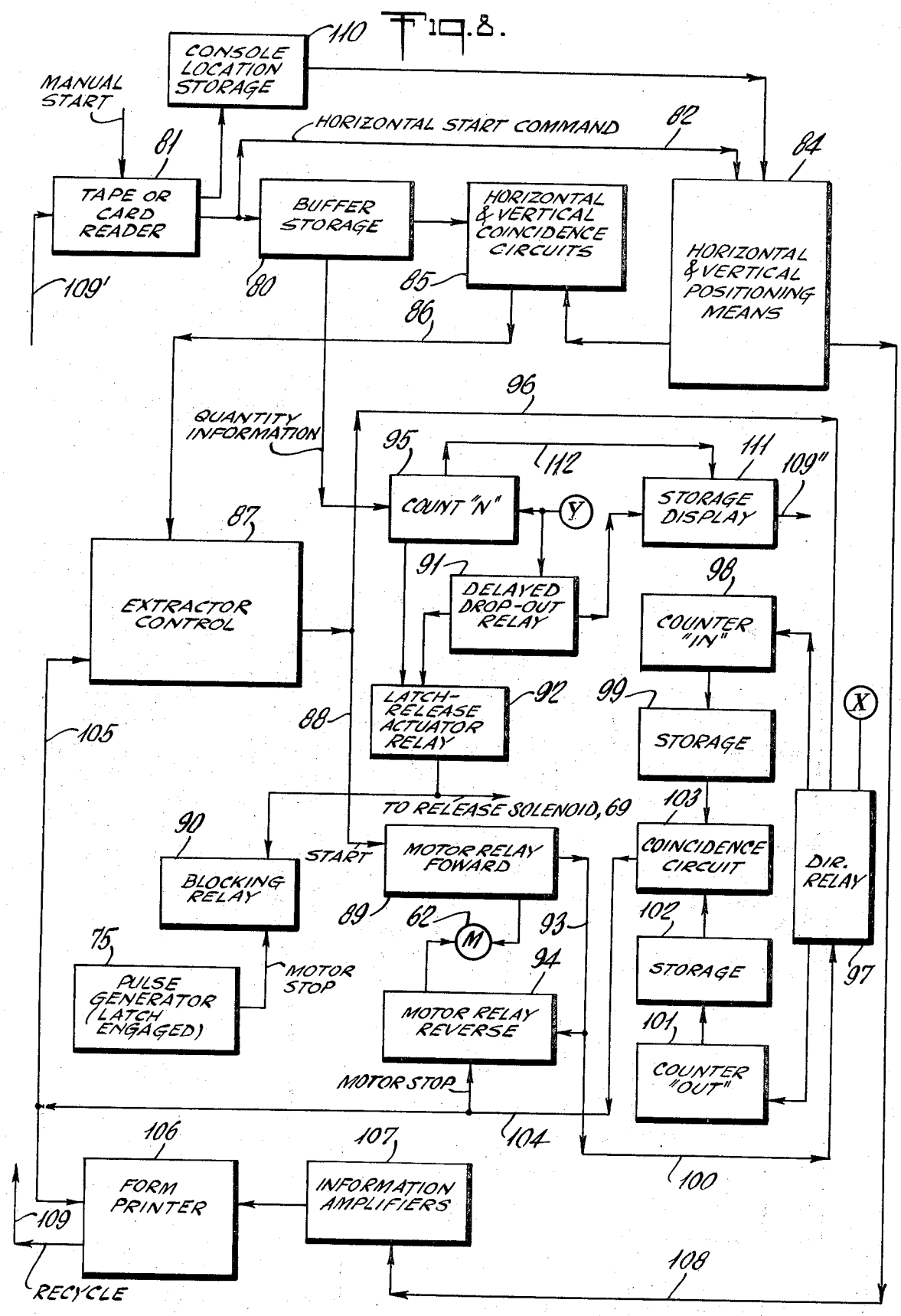

MEANS FOR SELECTIVELY PICKING A PRESELECTED NUMBER OF PANEL SPACED ARTICLES FROM AN INVENTORY STORAGE

This invention relates to an automatic article-retrieval device wherein desired quantities of like articles and of various articles are sought out and extracted from an inventory of a large variety of stored articles. The invention relates generally to the types of storage and retrieval system exemplified by Castaldi U.S. Pat. Nos. 3,490,616, 3,526,326 and 3,595,388, and the invention is particularly concerned with retrieval of articles of irregular or varying shape, such as compressible, flexibly bagged articles of clothing, carded merchandise, or the like.

Storage and retrieval systems of the character indicated may be described as presenting an inventory of a variety of stored articles wherein pluralities of like articles are accommodated in single storage compartments, all compartments being open at a single access surface, which in the case of a two-dimensional system is generally a vertical surface. A carriage and elevator provide two-component positioning for retrieval mechanism, the latter being operative once the desired storage-compartment location has been ascertained. In past systems, item-retrieval at the selected location has involved extraction of one article for each article-extraction cycle.

It is an object of the invention to provide an improved system of the character indicated.

Another object is to provide an improved article-retrieving mechanism for such a system.

A specific object is to provide, for such a system, an article-retrieving mechanism wherein a given single cycle of article retrieval is operative to deliver from storage a desired selected number of like articles.

A further specific object is to provide such a system which flexibly lends itself to such retrieval for variously sized and shaped articles, in variously sized compartments.

A still further specific object is to provide such a system wherein compressible or otherwise flexible merchandise, such as bagged articles of clothing, and/or carded or other irregularly shaped merchandise, may be retrieved in selected numbers and variety.

Other objects and various further features of novelty and invention will be pointed out or will occur to those skilled in the art, from a reading of the following specification, in conjunction with the accompanying drawings. In said drawings, which show, for illustrative purposes only, preferred forms of the invention;

FIG. 2 is a perspective, partly broken, view of the carriage and article-extraction means, forming part of the system of FIG. 1;

FIGS. 3 and 4 are, respectively, partly broken front and side views in elevation, of the carriage of FIG. 2;

FIG. 5 is a simplified diagram, to illustrate one form of article-extraction mechanism, and its positioning with respect to stored articles in a selected compartment;

FIG. 5A is a simplified view in perspective to further illustrate part of the structure of FIG. 5;

FIG. 5B is a view similar to FIG. 5 to show a modification, as to character of stored articles retrievable by the same mechanism;

FIG. 6 is a simplified fragmentary diagram showing alternative retrieval mechanism;

FIGS. 7A and 7B are simplified diagrams to illustrate different parts of a typical cycle of article-extraction, for the mechanism of FIG. 6; and FIG. 8 is an electrical circuit diagram, schematically illustrating automatic control of the system of FIG. 1.

Figure 1:
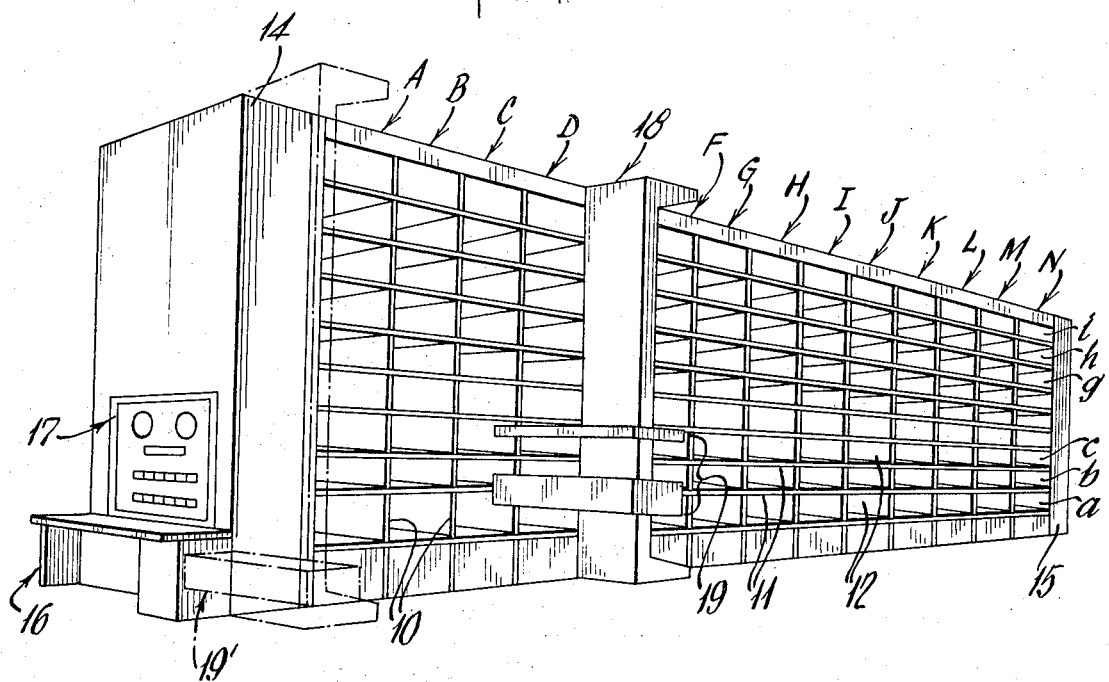
FIG. 1 is a simplified overall perspective view of a search and retrieval system of the invention.

The invention is shown in application to an inventory system for plural quantities of a variety of articles, of irregular and varying shape, such as flexibly packaged clothing items, for example, sweaters in individual flexible transparent envelopes. The system uses a two-dimensional matrix of storage compartments presenting open retrieval-access ends in a common vertical surface. A framework of columns 10, shelves 11, and divider panels 12 defines the storage compartments, shown in FIG. 1 to comprise major shelf spaces in each of fourteen horizontally adjacent vertical stacks A, B, C .... N, and at each of nine shelf levels $a, b, c ....$ $i$. Depending upon the width dimension of articles to be extracted from storage, the major shelf spaces may be further subdivided by partition walls (not shown); in FIG. 1A, the vertical stack D is shown, between columns 10 and divider walls 12, for the first three levels $a, b, c$. End housings 14–15 provide enclosures for control mechanism and maintenance or other articles not involved in the inventory storage, and a master desk console 16 and control input station 17 assist a single operator in supervising operation of the machine. A horizontally travelling carriage 18 with vertical-elevator means 19, rides a horizontal guide system (not shown in FIG. 1) and positions the elevator means 19 correctly for article-retrieval at a desired compartment location, for example at the $D_a$ location in FIG. 1, this designation being understood to identify the first (a) shelf level of the D stack, for retrieval of a selected plurality of like packages in a single item-retrieval cycle of reciprocation.

For the assumed case of a flexibly bagged sweater (or other article of clothing), the flexible bag will not have sufficient stiffness to stand on its edge, and I therefore provide divider panels 20 between successive bagged articles 21, as well as outer and inner panels 29'–22, to retain the array of bagged articles and panels in the storage compartment. To retain such an array of articles and panels, each storage compartment includes plural means such as detents or lugs 23–24, defining a forward substantially vertical plane of article retention for location of the current forward panel 20', which in the form shown is identical to all other divider panels 20; rear retention of the array is shown accomplished by one-way engaging friction feet 25 at spaced parts of the side and bottom edges of the rear panel 22. Preferably, each of the identical panels 20–20' is of relatively stiffly flexible sheet, as of suitable plastic, and of generally rectangular contour, conforming to the side and bottom surfaces of the compartment, with piloting clearance and having slight interference with detents 23–24. It will be later explained that in the form shown, the rear panel 22 is relied upon as a piston to push the entire array forward in a retrieval operation; panel 22 is thus relatively rigid, being shown in FIG. 5A with piloting spring feet 26 to assure wall clearance and consistent orientation within the compartment section, and being shown with a rigid retrieval-rod engagement fitting 27.

As in said Castaldi U.S. Pat. No. 3,490,616, each of the various compartments is identified by a differently characterized version of the same digital code, applied as by pressure-sensitive adhesive label techniques to a forwardly exposed edge of the compartment, as at edges of shelves 11. Such labels (28, FIG. 1A) are placed at corresponding offsets from the compartments which they identify, and the drive mechanism for the carriage and its elevator will function until character-scanning mechanism on the carriage and elevator eventually recognizes a preselected digitally identified compartment-access location.

In FIGS. 2, 3 and 4, the carriage 18 is seen to comprise a vertical guide column 30, secured at its lower end to a base frame 32 and at its upper end to another frame 33. The base frame 32 is a rectangular box of girders with means providing journalled support of two drive and support rolls 34-34' riding spaced locations of a single rail 35, which will be understood to extend the full length of the storage matrix of FIG. 1; rolls 34-34' are on drive shafts 36-36' synchronized by a sprocket connection 37. Lateral stability and alignment are provided by plural guide rolls 38 riding opposite sides of rail 35, at longitudinally spaced locations on base 32. The vertical column 30 is shown to comprise laterally spaced channel members 31 tied by spacers 39, and the rectangular upper frame 33 is also provided with spaced guide rolls 40, having edge-piloting engagement with opposite sides of an upper guide rail 41, directly above the main support rail 35. The elevator 19 is guided by rails or ways 42 on the outer surfaces of channels 36 and is vertically positioned by a carriage-mounted motor 43 and reduction-gear drive 44, to an endless chain 45; chain 45 is coursed over upper and lower sprockets 46-47 and over sprockets 48-49-50 at the point of connection to the reduction gear means 44. Another carriage-mounted motor 51 provides horizontal-drive power to rolls 34-34' via reduction gearing 52 and a sprocket connection 53 to the drive shaft 36'.

The elevator 19 is shown to comprise guide blocks 55-55' riding the ways 44 and mounted to a vertical side panel 56, extending between a lower platform 57 and an upper platform 58. Platforms 57-58 are vertically spaced to the extent of approximately twice the shelf-to-shelf height of a single article-storage compartment, thus enabling a basket or bin 59 to be removably placed on platform, and located as by blocks 59', for reception of articles removed from the shelf level of the compartment served by extractor mechanism 60 suspended from the upper platform 58.

Basically, the extractor mechanism 60 comprises an elongate arm 61 having horizontally guided suspension from platform 58 and having a cycle of reciprocation into and out of the compartment selected for article extraction; generally arm 61 must be long enough to extend all the way into such a storage compartment and still be adequately supported and guided from platform 58. As shown, reversible motor means 62 on platform 58 drives a pinion 63 engaged to a positioning rack 64 on one side of arm 61. Article-engaging means such as pointed rod 65 is mounted by means 66 at the projected end of arm 61 and is selectively positionable into and out of article-engaging position, i.e., into and out of engagement with the bore of fitting 27 on the rearmost article-support panel 22; the extreme inwardly projected position of these retrieval members is shown by phantom outlines 61'-65'-66' in FIG. 2 As shown in FIG. 5, the article-engaging means 65 is a hollow rod, at least to the point of supporting latching detents or spring fingers 67 near its forward end, the fingers 67 being radially inwardly cammed upon passage through the bore of fitting 27 and then spring-urged to their outer position shown, upon clearing said bore. A central cable 68 within rod 65 connects the latch fingers 67 to an actuating solenoid 69, also mounted on arm 61, for controlled release of a latched engagement to fitting 27 at the instant when the preselected desired number of articles (and panels) has been ejected (by forced outer-panel escape from detents 23-24) off the shelf into bin 60, thus leaving undesired articles in suitably advanced, more forward positions on the shelf 11 of the selected compartment.

Figure 1A:
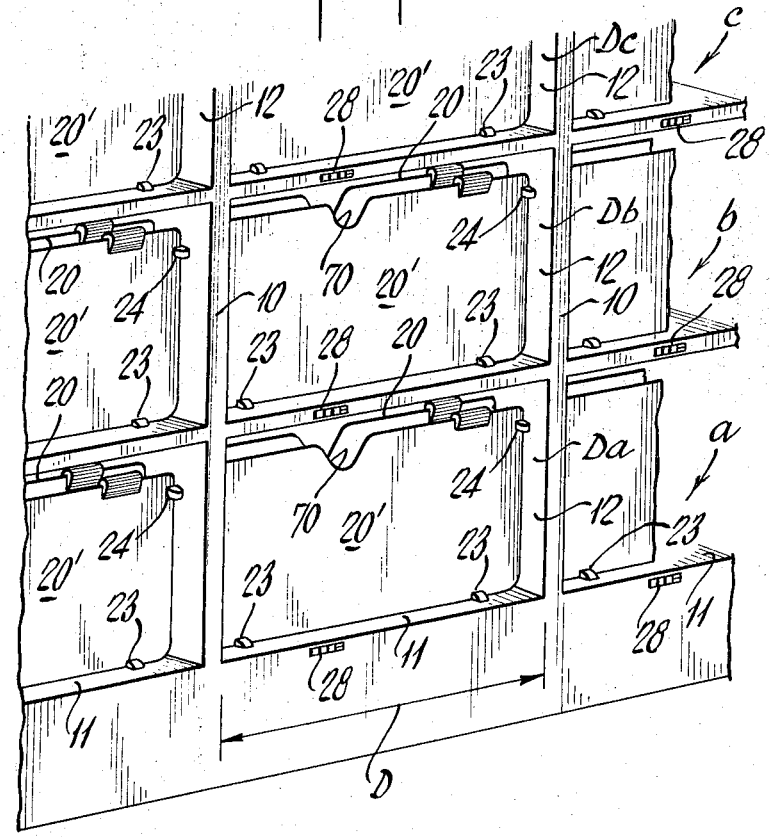
FIG. 1A is an enlarged fragmentary perspective view, to show open ends of some of the storage compartments served by mechanism of the invention.

In the alternative use suggested in FIG. 5B, the stored articles are so-called carded merchandise, being "blister-packed" as suggested at 21' to a suitable stiffening card 20". Such cards 20" thus serve the function previously attributed to divider panels, and the compartment dimensions are appropriate to the dimensions of mounting cards 20", to enable detent retention of the most forward carded article, by means 23-24. Retrieval is by the same means and engagement, at 65-27, as already described. It will be understood that for carded merchandise 21', the card 20" is so dimensioned, when vertically oriented as in FIG. 5B, as not to interfere with the projection path of retrieval means 61-65-66. On the other hand, the divider panels 20-20' of FIGS. 1A, 5, and 5A are shown taller, being locally recessed along the retrieval path alignment, as suggested at 70. However, in both applications, i.e., divided merchandise 21 (as in FIG. 5) or carded merchandise 21' (as in FIG. 5B), the retrieval-arm engagement at 65-27 will be understood to be positive and to enable firm, substantially vertical-plane orientation of the innermost panel 22 under the most loaded retrieval-stroke conditions.

In the form shown, sequencing of functions relies upon coordinated light sources and photocells, by way of illustrating certain mechanical-trip functions. A first such trip means, labeled X (see FIG. 2) is carried by retrieval arm 61, in register with striped pattern 72 of black and white, as provided by pressure-sensitive tape adhered to the elevator side wall 56; the light beam of this trip X will be understood to irradiate pattern 72, at least within the limited response alignment of the associated photocell, so that movement of arm 61 in a projecting stroke can develop an outward-bound count of stripes 72, for accurate count-down during the retraction stroke, returning arm 61 to its properly retracted position, whereupon motor 62 is stopped; alternatively, marks at 72 can be viewed as identifying merely the rearmost position to which arm 61 is to be retracted prior to disconnection of drive 62.

In another synchronizing function, trip means 73 is carried by arm 61 and is so oriented as to respond to the latch condition of engagement 65-27, during the course of the projection stroke of arm 56. This may be done by making means 73 part of an inductive pick-up device, wherein part 73 is a ferromagnetic element carried by cable 68 and therefore subject to a small, momentary but rapid displacement as the latch elements 67 snap into place behind fitting 27; coil means 74 (FIG. 5) carried by arm 61 and inductively linked to the movable core element 74 will provide an output pulse signal at 75 to signify the latching event.

In a third synchronizing function, trip means Y is carried by the upper platform 58 of elevator 19. There, it is so oriented as to cast a light beam downwardly at the selected compartment, and from an elevation at which the top edge of the detent-retained forward panel 20' will be shielded from photocell response (alignment 76). Along this edge, another reflective treatment (77) assures photocell response to the reflected light, as the forward panel 20' and its article 21 are being removed. Passage of each ejected article (panel 20' ) will thus momentarily create a photocell response to light reflection, thus generating an electrical signal useful in counting the number of removed articles, it being noted that in the course of article removal each article (and its forward-retaining panel 20' ) is expelled from the supporting shelf with a sufficiently accelerating motion to assure the photocell a discrete response to the reflective treatment, for each successively extracted article. This count of articles is used to develop an electrical signal, upon match of the count to a preselection of the number to be counted, whereupon the signal is used to disengage the means 65–67–27 from article or panel-engaging position. Such removal occurs in the course of retracting arm 61 and calls for no interruption of the retraction stroke. The remaining articles and panels 20 are left in an array, retained by detent means 23–24 and the newly presented forward panel 20', close to but slightly offset from the forward edge of the compartment shelf, in readiness for the next article-counting cycle.

OPERATION

Insofar as elevator positioning is concerned, FIG. 8 is very schematic, since adequate description will be found in said Castaldi U.S. Pat. No. 3,490,616. Briefly, coded data unique to the desired article (storage compartment) to the desired number of articles is entered into buffer storage means 80 from console-controlled means such as push-button keys, or tape or card reader means, suggested at 81. The reader means is shown providing a start command in line 82 to the horizontal and vertical scanning and positioning means, using one or more photocell and light-source units (suggested at 78—78'—78'' in FIG. 4) carried by the carriage 18 and elevator 19, to enable scanning of edge-marked codes for coincidence recognition with stored data at 80; the functions of two-component (carriage-elevator) drive and character scanning are suggested at 84, providing an output to appropriate recognition circuits 85. Upon detection of complete two-component recognition (signifying elevator-borne extractor mechanism at the desired compartment), an output signal in line 86 is operative to initiate the extraction cycle, via extractor-control means 87.

The cycle-initiating signal from control means 87 is used in a first line 88 to relay means 89 to excite and thus drive motor 62 for the projecting stroke of arm 61. As this stroke proceeds, trip means 67–73–75 is on the constant alert for detection of latching to the back end of the array of articles (and panels); its response to such latching will be to generate a polarized pulse, which is supplied (via a blocking relay 90) as a "Motor-stop" control pulse to relay 89, thus terminating the projection stroke; the action of blocking relay 90 is governed by a delayed drop-out relay 91 and by a latch-release relay 92, to be later explained, it being understood that blocking relay 90 is operative to pass the latching pulse direct to motor relay 89. Motor-stopping operation of relay 89 causes a control output signal in line 93 and is operative upon a second relay 94 to drive motor 62 for the retraction stroke of arm 61, and in the course of such stroke one or more articles are ejected, as previously explained.

The number of ejected observed is observed by trip means Y, until matched with the preselected number "N," such "quantity" information being supplied to counter means 95 by a suitable buffer-storage connection. Upon detection of achievement of the preselected count, an output signal from counter 95 to the latch-release actuator relay 92 is effective to excite solenoid 69 and to thereby remove the latch fingers 67 from rear-panel engagement, thus leaving remaining articles and panels on the shelf while allowing the arm-retraction stroke to proceed to completion. It will be understood that the signal which is delivered to the latch-release solenoid 69 may also actuate the blocking relay 90, to thereby momentarily insure interruption of any possible motor-stopping pulse from generator 75. Also, in the event that the number of articles to be extracted (for any given item-retrieval cycle) exceeds the number available for extraction (from the selected compartment), the delayed drop-out relay 91 will take note of this fact by dropping out for failure to receive (at the normal expected rate) the full buffer-stored quantity of Y-trip pulses; drop-out of relay 91 is operative upon relay 92 and solenoid 69 to release rear-panel engagement without removing rear panel 22 from the compartment.

During the course of the indicated projection and retraction strokes, trip means X has also been operative. The stroke-initiation signal from control means 87 was operative in line 96 to set the correct polarity (direction) of a relay (e.g., D.P.D.T.) 97, so that pulses from trip means X are fed to an "IN" counter 98 for storage at 99, the full extent of the actual projection stroke being thus registered at 99. Thereafter, upon rear-panel latching, the motor-reversing signal in line 93 was also supplied in line 100 to reverse the polarity of relay 97, thus conditioning X-developed pulses for delivery to an "OUT" counter 101, for storage at 102. A coincidence circuit 103 observes storage circuits until they match, whereby a motor-stop signal is generated in line 104 to disable the motor relay 94, thus terminating the retraction stroke.

Having thus completed the retrieval of the desired number of articles at the preselected compartment, this fact may be recorded by using the signal in line 104 to (a) reset the extractor control, via line 105, and (b) to trip the print mechanism 106 of, say, a billing or shipping document; the mechanism 106 will be understood to enter a printed line for the number and description of the extracted articles, relying upon suitable information amplifiers 107 supplied with compartment coordinate data in line 108 from the two-coordinate positioning means 84. An output line 109 from the printer 106 provides a recycling pulse, as to the card-reader input 109', for commencement of a similar cycle of two-coordinate search and third-coordinate retrieval of preselected (and possibly different numbers of) other articles, at a different compartment location.

Having thus recycled until completion of order data at the reader 81, the completion of the last-filled item in the order will be recognized at reader 81, upon receipt of the last retrieval "completion" pulse at input 109'. Such recognition at 81 will be understood to develop an output signal to suitable means 110 connected to positioning means 84 to govern return of the carriage and elevator to operator access, alongside the console 16, as suggested by heavy phantom outline 19' in FIG. 1.

Should the filling of any part of the order have encountered the above-noted circumstance of an insufficient quantity in any particular selected storage compartment, the fact will be noted by the drop-out action of relay 91, which may have back contacts either to shut down the cycle, or to by-pass any continued effort to fill the ordered quantity, or to recycle the search and retrieval functions elsewhere in the storage matrix where further quantities of the same size and style of the same article may be found. Some of these functions are schematically shown in FIG. 8, wherein the display device 111 responds (in line 112) to the remaining uncounted fraction of the desired number to be extracted and displays the uncounted number, should relay 91 drop out before achieving the desired count. Alternatively, the means 111 may merely give a warning signal unique to the exhausted-compartment location, so that operating personnel can replenish that part of the stored inventory. Additionally, operation of the shortage-indicating means 111 may deliver an output signal at 109'' to the reader 81 to recycle the search and retrieval cycle to another storage compartment having more of the same article, for extraction of the balance needed to complete retrieval of the desired quantity.

FIG. 6 illustrates application of the invention to storage and retrieval of compressible articles 21 wherein all dividing and end panels 20 are duplicates of each other. The forward exposed one of such panels receives its locating support by means as already described at 23–24, and a strip of detent abutments 114, which may line opposed interior vertical walls of the compartment, enables at least the most rearward panel to derive its positioning support, regardless of the full or relatively exhausted condition of the selected compartment. The article-retrieving mechanism is shown to comprise a tubular extractor bar 115 (in place of bar 65) within which an arm 116 is retractable and pivotable, as to the item-retracting position shown in phantom outline 116' behind the rearmost panel 20. Arm 116 is shown flat and freely enterable in local slot formations 117 at the end of bar 115. A pin 118 spanning a chord of the tubular bar 115 is the means of pivotal and lost-motion engagememt of arm 116 to bar 115, via an elongate slot 119 in arm 116. An actuating rod or link 120 has a pin and transverse-slot connection to arm 116, on an alignment offset from that of slot 119, and compression-spring means 121 normally urges the parts to the retracted relationship shown in full lines, the same being limited by pin 118 in the left end of slot 119; the broken rear end 122 of rod 120 is subjected to the previously described reciprocating cycle of arm 61.

In its item-retrieving cycle of reciprocation, bar 115 and its contents are forwardly advanced while a light-source and photocell trip Z (mounted at the projected end) is constantly on the alert for lack of presence of the array of articles and dividers. As explained more fully in my copending application (Attorney Docket No. 2243), a trip as at Z may respond strikingly to reflective tape on a wall of the compartment, namely, as a bright steady reflection once the response axis (heavy broken arrow) clears the array. Operation of trip Z provides a signal to a holding relay 123 to the solenoid 124 for braking means 125, carried by the elevator slide 19 and operative to halt further projection of the tubular bar 115. Further advance of the projecting means 122 is therefore operative to compress spring 121 as arm 116 is extended, until pin 118 strikes the right end of slot 119. Still further advance at 122 institutes a counterclockwise turning moment on arm 116, and by the time the position 116' is achieved, (a) the collar 126 of means 122 is able to actuate a limit switch 127 for deactivating the motor-forward relay 89 (FIg. 8), (b) a mechanical spring latch 128 has engaged collar 126 to the corresponding collar portion 129 of bar 115, and (c) the holding relay 123 is released, to allow release of the brake means 125. The cycle then proceeds as already described in connection with FIG. 8, namely, retrieving-bar means 115–122 is retracted with arm 116 firmly positioned in the item-retrieving position 116'. When the desired item-retrieved count is noted by counter means 95, the latch-release actuator relay 92 excites a solenoid 130 for releasing the latch 128 from engagement to collar 129, thereby allowing spring 121 to return arm 116 to its retracted position, all without interruption of the retraction stroke, as will be understood.

It will be seen that the described apparatus meets all stated objects with basic simplicity and assurance of programmed function. At any given preselected article-storage location, the single stroke of the retraction mechanism is automatically (a) limited only to the extent necessary to engage the most inwardly stored article, (b) effective to pick-off only the desired number of available articles, and (c) operative to leave all remaining articles in a forwardly advanced position in the compartment. Finally, having completed the automatically recycled pick-off of desired numbers of different articles, the carriage and elevator are returned to the operator console, where collected articles of a given order are all contained in the bin 59. Mere replacement with an empty bin 59 will enable the machine to be processing the next order while the previously collected materials aare being packed for shipment.

While the invention has been described in detail for the preferred forms shown, it will be understood that modifications may be made without departure from the claims.

What is claimed is:

1. Article storage and retrieval apparatus, comprising a frame including a multi-dimensional matrix of stationary storage compartments having open ends in essentially a single retrieval-access surface common to the compartments of said matrix, one of the dimensions of said matrix being vertical, each said compartment including means accommodating an aligned array of plural adjacent like articles, the array being aligned generally normal to said surface with an end article of each array positioned adjacent said surface, a movable panel outside the outermost and innermost articles in each array and a movable panel between adjacent articles of each array, means coacting between each said compartment and at least the outermost and innermost panels thereof for movably retaining said array in a forward position in its compartment; related multi-component guide means spanning said matrix adjacent said surface, retrieval-slide means guided by said guide means and means for selectively positioning said slide means adjacent a selected one of said compartments; item-retrieval means carried by said slide means and including selectively reciprocable means extendable generally normal to and through said surface and alongside arrayed articles and panels in the selected compartment, the extent of such extension in the compartment being at least the full extent of the article array to the innermost panel in the selected compartment, panel-engaging means carried by said reciprocable means and operable to engage the innermost panel when at the said full-extent position of said reciprocable means, and means responsive to such panel-engaging operation for initiating a retraction stroke of said reciprocable means, whereby panels and articles in said array are moved in unison toward said surface, successive articles and panels at said surface being ejected from the selected compartment at said surface.

2. Apparatus according to claim 1, in which said retrieval-slide means includes article-receiving means positioned beneath the selected compartment and adapted to collect articles as they are ejected at said surface.

3. Apparatus according to claim 2, in which said article-receiving means is a selectively removable collection bin, detachably carried by said slide means.

4. Apparatus according to claim 1, in which said reciprocable means includes an extendable arm having guided support on said slide means.

5. Apparatus according to claim 4, in which said reciprocable means includes a reversible motor drive for extensibly positioning said arm.

6. Apparatus according to claim 1, including trip means carried by said slide means and responsive to passage of each ejected article to develop an electrical signal, means including a counter connected to said trip means and preselected for the number of articles to be retrieved from the array at the selected compartment, and counter-operated means connected to said panel-engaging means for releasing the same from panel engaging position upon a count of said number of electrical signals, whereby only said number of articles is ejected during the retraction stroke of said reciprocable means.

7. Apparatus according to claim 6, in which said trip means includes a light source producing a beam that crosses the path of articles and panels ejected from the selected compartment, and a photocell responsive modulation of beam light occasioned by such ejection.

8. Apparatus according to claim 7, in which the photocell and light source are both carried by said slide means, being positioned to illuminate a predetermined localized area of each panel as it passes said surface, said localized area of each panel being sufficiently reflective in relation to reflection from each article as to generate an electric pulse in recognition of each successive outermost panel passing said surface.

9. Apparatus according to claim 8, in which each said localized area is characterized by an applied light-reflective material.

10. Apparatus according to claim 1, in which said reciprocable means includes means generating an electrical signal in the course of the projection stroke and upon detection of clearing the innermost of said panels in the selected compartment, said last-defined means being connected to actuate said panel-engaging means into panel engagement upon generation of said electrical signal.

11. Apparatus according to claim 10, and means operatively connected to said signal-generating means for terminating the inward stroke upon generation of said signal.

12. Apparatus according to claim 11, in which said last-defined means includes means initiating a retraction stroke of said reciprocable means upon generation of said signal.

13. Apparatus according to claim 1, in which said panels and articles are independently movable.

14. Apparatus according to claim 1, in which each said article is mounted to and therefore movable in unison with an adjacent panel.

15. In a storage and retrieval system wherein a two-component positioning mechanism is operative to place an article-retrieval deck alongside the open end of a predetermined article-storage compartment in a two-dimensional matrix of such compartments, wherein corresponding open ends of the compartments are in essentially a single article-retrieval surface, and wherein movable upstanding panels separate and removably retain individual articles in the predetermined storage compartment, an arm and guide means therefor with means for mounting the same to such deck in an orientation to permit guided arm reciprocation through said surface and into a selected compartment, actuating means producing a cycle of projection and retraction of said arm, arm-engageable means carried by the innermost of said panels and positioned in alignment with the reciprocation path of said arm, panel-engaging means carried on a projected part of said arm and poised for engagement with said arm-engageable means, means responding to such engagement for halting the projection stroke and initiating a return stroke of said cycle, ejected-article counting means including means producing an electrical-signal output upon count of a preselected number of articles to be retrieved, and means connected to said last-mentioned means and operative during the retraction stroke to disengage arm and panel; whereby in a single two-stroke cycle of said arm, only the selected number of items will be withdrawn from storage at the selected compartment.

16. Storage and retrieval apparatus according to claim 15, in which a digitalized character identification unique to each compartment is externally exposed substantially at said surface, said character identifications being in corresponding areas of all compartments in relation to said open ends, said two-component positioning means being guided for movement adjacent the other side of said surface; drive means for two-component traversal of said arm and guide means therefor over the ends of said compartments, said device including character-scanning means, a compartment-digit selector, and coincidence-detecting means in controlling relation with said drive means and connected to said scanning means and selector for generation of an electrical signal upon scan recognition of a selected compartment digit, said connection being such as to stop said traversal upon selected-compartment positioning of said device and to initiate a cycle of said actuating means.

* * * * *